Aug. 3, 1954
B. G. PRICE ET AL
APPARATUS FOR MAGNETIC DETECTION
OF FLAWS IN FERROMAGNETIC PIPE
2,685,672
Filed March 1, 1952
2 Sheets-Sheet 1
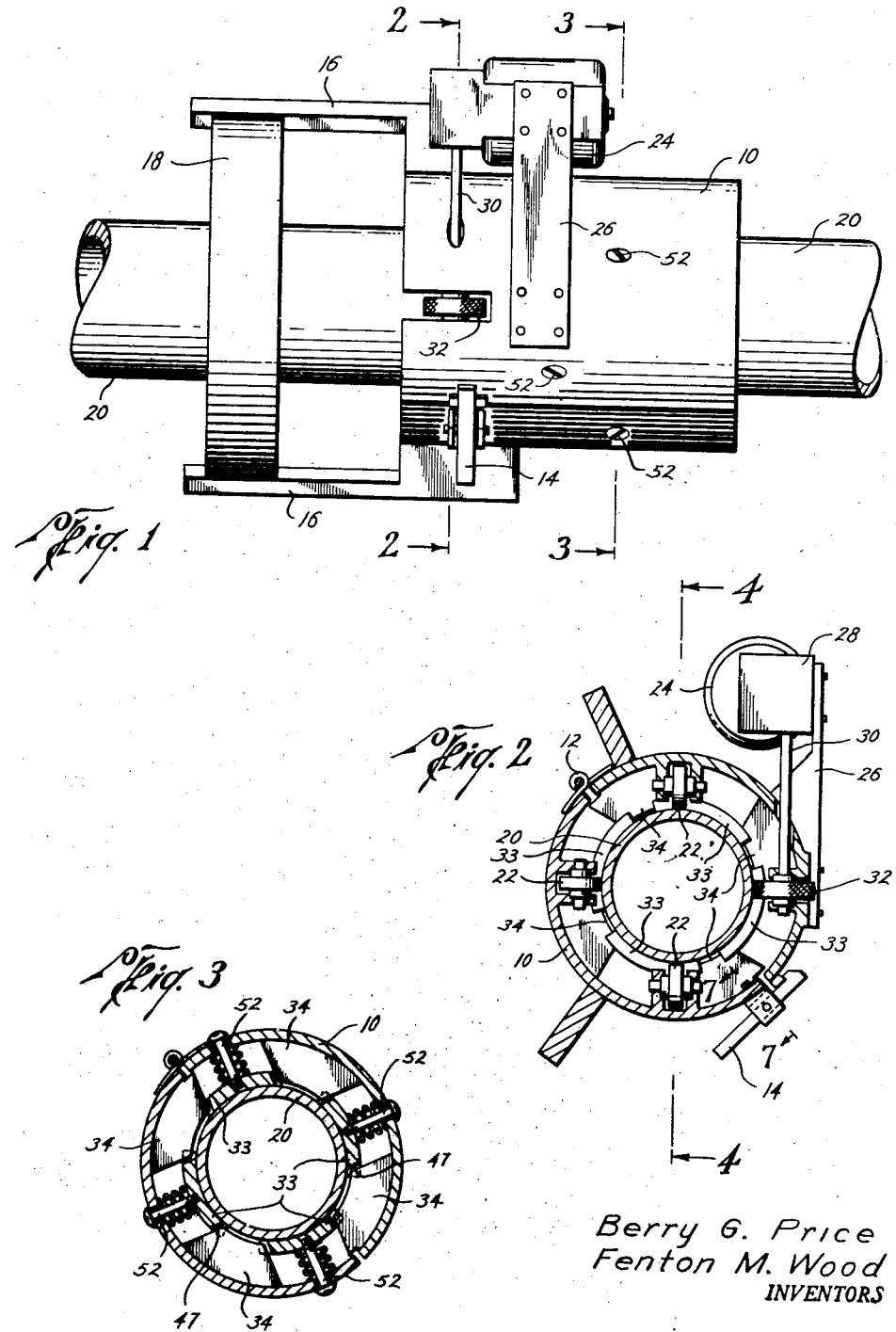
Berry G. Price
Fenton M. Wood
INVENTORS
BY Thomas O. Arnold
ATTORNEY Aug. 3, 1954
B. G. PRICE ET AL
2,685,672
APPARATUS FOR MAGNETIC DETECTION
OF FLAWS IN FERROMAGNETIC PIPE
Filed March 1, 1952
2 Sheets-Sheet 2
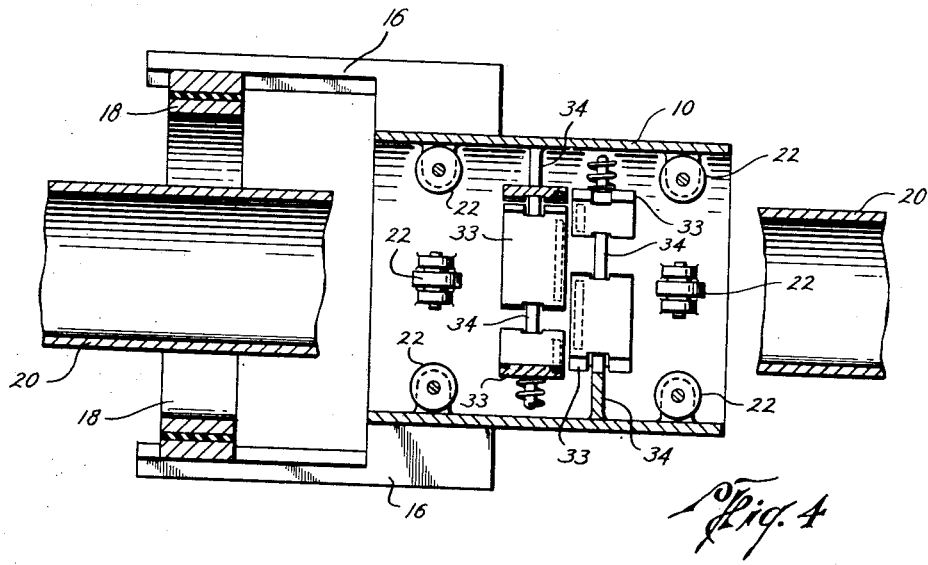
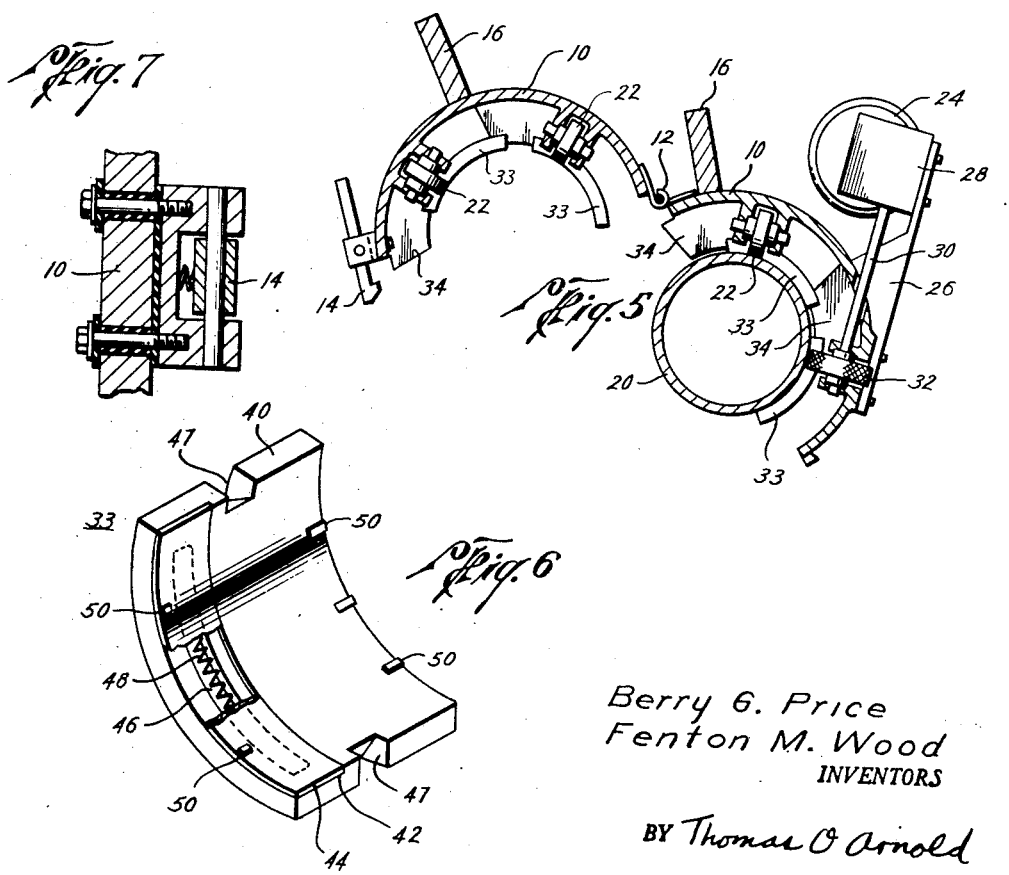
Berry G. Price
Fenton M. Wood
INVENTORS
BY Thomas O Arnold
ATTORNEY Patented Aug. 3, 1954

2,685,672

UNITED STATES PATENT OFFICE 2,685,672

APPARATUS FOR MAGNETIC DETECTION OF FLAWS IN FERROMAGNETIC PIPE

Berry G. Price and Fenton M. Wood, Houston, Tex., assignors, by mesne assignments, to Tuboscope Company, Harris County, Tex., a corporation of Delaware Application March 1, 1952, Serial No. 274,476

2 Claims. (Cl. 324—37)

This invention relates to inspection of ferromagnetic materials for corrosion, cracks and other flaws and discontinuities, and more particularly to improvements in means for inductive magnetic detection of particular flaws in ferromagnetic pipe. Ferromagnetic, as used herein, includes products of nickel and cobalt as well as iron.

An object of this invention is to provide means for mounting an induction magnetic pickup coil more closely adjacent to pipe test specimens than has been possible before.

A further object of this invention is to provide means for mounting an induction magnetic pickup coil in which the coil will be protected from damage and will have long life.

Other and more particular objects will appear more fully from the following description and accompanying drawings wherein:

Figure 1 is an elevational view of the invention positioned upon a length of drill pipe being tested.

Figure 2 is a vertical section taken along line 2—2 in Figure 1, illustrating in particular, the mounting of wheels which support the apparatus.

Figure 3 is a vertical section taken along line 3—3 in Figure 1, illustrating in particular the mounting of pickup shoes and guides therefor within the carriage.

Figure 4 is longitudinal vertical section taken along line 4—4 in Figure 2.

Figure 5 is similar to Figure 2, being a section taken along line 2—2 in Figure 1, but shows the apparatus in its open position.

Figure 6 is a detail partially in section of a pickup shoe in which the magnetic pickup coil is mounted.

Figure 7 is a section taken along line 7—7 in Figure 2 illustrating in particular the latch which secures the two halves of the apparatus together during operation of the invention.

In inductive magnetic detection of flaws in ferro-magnetic materials it is critical to the effective detection of minute invisible discontinuities that the detection coil be of critical dimensions, be wound from fine and delicate wire, and be so mounted as to be in substantial contact with the test specimen, while at the same time being protected from damage due to abrasion by the surface of the test specimen. This invention provides an improved mounting for the pickup coil for testing pipe by positioning the coil within a shoe which is fitted to the pipe and provided with certain protective features, and which is mounted in a particular carriage and resiliently urged against the pipe.

As illustrated in the drawings, the basic support member of the invention may be a cylinder or carriage 10 which is divided into two semi-cylindrical halves hingedly connected by a hinge 12 on one side and which may be latched together on the opposite side by the latch 14, illustrated particularly in Figures 2 and 5, and in section in Figure 7.

A plurality of L arms 16 may be mounted on the cylinder or carriage 10 at one end extending beyond the end thereof, to support magnetizing and/or vibrating coils 18 schematically indicated in Figures 1 and 4.

The carriage 10 is adapted to be fitted around a length of drill pipe or other ferromagnetic pipe 20 which is to be the test specimen. In a preferred embodiment of the invention a plurality of wheels or rollers 22 are positioned within the carriage 10 so as to be perpendicular to the surface of the pipe 20. Two sets of rollers are spaced longitudinally apart from each other as illustrated in Figure 4, the rollers in each set being circumferentially spaced around the specimen as illustrated in Figure 2. The rollers 22 are adapted to engage the pipe as illustrated in Figure 2, and to facilitate easy movement of the carriage along the pipe.

Means are provided for imparting movement along the pipe 10 to the carriage. This may take the form of an electric motor 24 mounted on the carriage by a bracket 26. The motor 24 may act through a gear box 28 to drive a shaft 30 which in turn drives a drive wheel 32. The drive wheel 32 is mounted in a manner similar to the rollers 22, and is provided with a knurled surface which engages the pipe 20, thereby moving the carriage along the pipe. Alternative embodiments may use different means for providing motion to the carriage, e. g., pulling the carriage with a cable.

Means for supporting and guiding the pickup shoes 33 are provided. In the embodiment illustrated such means take the form of wedge guides 34 which are secured inside the cylinder 20 in a plane perpendicular to the axis thereof. The individual guides 34 are spaced apart as indicated in Figure 3, the adjacent sides of two adjacent guides being substantially parallel so that the shoes 33 may move inwardly and outwardly along the guides.

When it is desirable to have a second row of shoes extending around the pipe, as in the embodiment illustrated, a second set of guides spaced around the cylinder 10 are used as shown in Figure 4.

A preferred form of pickup shoe 33 is detailed in Figure 6, wherein a backing 40 of non-magnetic metal or plastic is shown with a cylindrical curvature of such radius that the inside face of the backing will fit the surface of the pipe to be tested. The backing 40 has a broad but very shallow annular recess cut in the inside face thereof along one edge of the backing to receive a foil 44 of a non-magnetic metal such as brass, or other non-magnetic material. The foil 44 constitutes a part of the face of the backing, and forms a cover for an annular coil slot 46 which opens into said recess. A pickup coil 48 is positioned within the coil slot immediately adjacent the foil 44. Preferably the coil 48 is mounted directly on the foil 44. Each end of shoe 33 is provided with a guide slot 47 which is adapted to receive the substantially parallel edges of the wedge guides 34.

The foil 44, though appearing to have substantial thickness in the drawings, is actually about .005 to .020" thick. Means are provided to prevent excessive abrasive wearing of the foil 44 as the shoe slides along the test pipe. This may take the form of a plurality of tungsten carbide surfaces or points 50 positioned on the inside face of the backing 40. The points 50 protrude from the face of the shoe backing only a few thousandths of an inch so that they will absorb most of the wear from sliding action while not preventing the pickup coil from being exceedingly close to the test pipe, separated therefrom only by the foil 44 which is actually in light contact with the pipe.

Means are also provided for resiliently urging each shoe 33 toward and against the test pipe 20. Figure 3 illustrates a preferred embodiment showing one set of four shoes 33 in section, the guide slots 47 in the shoes having been cut by the section. The substantially parallel edges of the wedge guides 34 fit loosely into the guide slots 47 in the shoes 33 so that the shoes may slide inwardly and outwardly in a plane perpendicular to the axis of the test pipe 20.

Into the back of each shoe 33 there is secured a bolt 52. Each bolt extends outwardly through a hole in the carriage cylinder 10, which hole is large enough to permit free movement of the bolt shaft therethrough. The heads of the bolts 52, however, will not pass through the holes in the cylinder so that the bolt heads function as stops which prevent the shoes from falling out of the assembly when the two halves thereof are opened. Surrounding each bolt 52, and between the respective pickup shoe and the carriage cylinder, a coil spring may be positioned to resiliently urge the shoe 33 away from the cylinder 10 and toward the pipe 20.

In the operation of the invention, the two halves of the assembly are opened and placed around a piece of pipe to be tested and latched closed again with the latch 14. The motor 24 is turned on. It drives the drive wheel 32 which in turn moves the entire assembly along the pipe. If the vibrating and magnetizing coils 18 are energized, or if the test specimen is properly magnetized by other means, then each pickup coil has a voltage generated therein when it passes over a discontinuity in the pipe, such as a fatigue crack, a corrosion pit, or other flaw. This voltage fluctuation is recorded and the resulting record is examined to determine the condition of the pipe.

It is essential in the detection of minute flaws that the pickup coil be of very fine and, therefore, very delicate wire. It is also essential that the coil be positioned exceedingly close to the surface of the test specimen, which usually is a rough, abrasive surface.

In all mountings known prior to this invention coils which were placed close enough to the test pipe to detect minute flaws were subject to damage due to abrasion by the surface of the pipe. As a result of this, inductive magnetic inspection has not heretofore been practical for the detection of minute invisible flaws on the order of .010" in depth and .025" in length.

This invention is a means for mounting an induction pickup coil so that the outermost turn thereof is within .015 to .030" of the test pipe, while at the same time protecting the coil from wear. The tungsten carbide points absorb the wear while the foil protects the coil from miscellaneous protrusions. The coil may be mounted directly on the foil which is substantially in contact with the pipe, without damage to the coil. Due to the shape of the shoe, the coil is fitted closely to the pipe. The individual mounting of each coil in a separate shoe, and of each shoe with its own independent means for resiliently urging the shoe against the pipe eliminates possible upset of more than one coil by a single protrusion on one side of the pipe. The invention effects longer total life and better sensitivity of the coil.

It is understood that modifications can be made in the invention as herein described without departure from the spirit thereof, and therefore, that the description is to be construed as illustrative only.

We claim:

1. In inductive magnetic testing apparatus for drill pipe, a pick-up shoe comprising a backing of substantially non-magnetic material adapted to fit the curvature of the surface of said drill pipe, said backing having an annular recess on the inside surface thereof, said backing having an annular coil slot opening into said annular recess, said annular coil slot having a coil of wire positioned therein, said recess being fitted with a non-magnetic foil forming a cover for said coil slot, said backing having fitted on the inside thereof at least three wear resistant surfaces protruding from the inside of the backing, said backing having at least two guide slots therein, each adapted to receive a guide.

2. At least one pick-up shoe as described in claim 1 mounted in a carriage of generally cylindrical form in two sections hingedly connected together, said carriage having mounted thereon rollers adapted to support said carriage around said pipe and to facilitate easy movement along said pipe, said carriage having mounted thereon motor means for driving at least one of said rollers thereby effecting movement of said carriage along said pipe, guides secured to said carriage and adapted to slide within said guide slots in said pick-up shoe, and means for urging said pick-up shoe against said pipe.

References Cited in the file of this patent

UNITED STATES PATENTS

| Number | Name | Date |
|---|---|---|
| 1,933,547 | Drake et al. | Nov. 7, 1933 |
| 2,111,210 | Ebel | Mar. 15, 1938 |
| 2,276,011 | Billstein | Mar. 10, 1942 |
| 2,308,159 | Drummond et al. | Jan. 12, 1943 |
| 2,410,803 | Barnes et al. | Nov. 12, 1946 |
| 2,594,332 | McKee et al. | Apr. 29, 1952 |

FOREIGN PATENTS

| Number | Country | Date |
|---|---|---|
| 159,094 | Austria | July 10, 1940 |